United States Patent
Dias et al.

(10) Patent No.: US 11,436,056 B2
(45) Date of Patent: *Sep. 6, 2022

(54) ALLOCATION OF SHARED COMPUTING RESOURCES USING SOURCE CODE FEATURE EXTRACTION AND CLUSTERING-BASED TRAINING OF MACHINE LEARNING MODELS

(71) Applicant: EMC IP Holding Company LLC, Hopkinton, MA (US)

(72) Inventors: Jonas F. Dias, Rio de Janeiro (BR); Adriana Bechara Prado, Niterói (BR); Tiago Salviano Calmon, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 999 days.

This patent is subject to a terminal disclaimer.

(21) Appl. No.: 16/039,743

(22) Filed: Jul. 19, 2018

(65) Prior Publication Data

US 2020/0026577 A1    Jan. 23, 2020

(51) Int. Cl.
*G06F 9/50* (2006.01)
*H04L 41/5003* (2022.01)
(Continued)

(52) U.S. Cl.
CPC .............. *G06F 9/5077* (2013.01); *G06F 8/74* (2013.01); *G06F 8/75* (2013.01); *G06F 9/505* (2013.01);
(Continued)

(58) Field of Classification Search
None
See application file for complete search history.

(56) References Cited

U.S. PATENT DOCUMENTS 10,269,029 B1    4/2019  Evans
10,817,604 B1 *  10/2020 Kimball .................... G06F 8/73
(Continued)

OTHER PUBLICATIONS

Allamanis et al., "Mining source code repositories at massive scale using language modeling," in Proceedings of the 10th Working Conference on Mining Software Repositories, 2013.
(Continued)

*Primary Examiner* — Qing Chen
(74) *Attorney, Agent, or Firm* — Ryan, Mason & Lewis, LLP

(57) ABSTRACT

Techniques are provided for allocating shared computing resources using source code feature extraction and cluster-based training of machine learning models. An exemplary method comprises: obtaining a source code corpus with source code segments for execution in a shared computing environment; extracting discriminative features from the source code segments in the source code corpus; obtaining a trained machine learning model, wherein the trained machine learning model is trained using samples of source code segments from clusters derived from clustering the source code corpus based on (i) a term frequency metric, and/or (ii) observed values of execution metrics; and generating, using the trained machine learning model, a prediction of an allocation of resources of the shared computing environment needed to satisfy service level agreement requirements for source code to be executed in the shared computing environment. The discriminative features may be extracted from the source code corpus using natural language processing techniques and/or pattern-based techniques.

20 Claims, 8 Drawing Sheets

(51) Int. Cl.
| | |
|---|---|
| *G06F 8/75* | (2018.01) |
| *G06K 9/62* | (2022.01) |
| *G06F 8/74* | (2018.01) |
| *G06N 20/00* | (2019.01) |
| *G06F 16/2457* | (2019.01) |
| *G06F 40/205* | (2020.01) |
| *G06V 10/70* | (2022.01) |

(52) U.S. Cl.
CPC ...... *G06F 9/5072* (2013.01); *G06F 16/24578* (2019.01); *G06F 40/205* (2020.01); *G06K 9/6218* (2013.01); *G06N 20/00* (2019.01); *G06V 10/768* (2022.01); *H04L 41/5003* (2013.01); *G06F 2209/5019* (2013.01)

(56) References Cited

U.S. PATENT DOCUMENTS

| | | | | |
|---|---|---|---|---|
| 2009/0180430 | A1* | 7/2009 | Fadell | H04L 47/824 370/329 |
| 2009/0307699 | A1 | 12/2009 | Munshi | |
| 2012/0330711 | A1* | 12/2012 | Jain | G06F 9/5072 709/224 |
| 2014/0379619 | A1* | 12/2014 | Permeh | G06F 9/5038 706/12 |
| 2015/0006734 | A1* | 1/2015 | Parikh | G06F 9/50 709/226 |
| 2016/0021024 | A1* | 1/2016 | Parikh | G06F 9/50 709/226 |
| 2016/0217390 | A1* | 7/2016 | Shoaib | G06N 20/10 |
| 2016/0359668 | A1* | 12/2016 | Udupi | G06F 9/45533 |
| 2018/0157743 | A1* | 6/2018 | Hori | G06N 3/0445 |
| 2019/0034227 | A1* | 1/2019 | Suman | G06F 9/4881 |
| 2019/0079741 | A1 | 3/2019 | Makkar | |
| 2019/0102693 | A1 | 4/2019 | Yates | |
| 2019/0130327 | A1 | 5/2019 | Carpenter | |

OTHER PUBLICATIONS

J. MacQueen, "Some methods for classification and analysis of multivariate observations.," Proceedings of the Filth Berkeley Symposium on Mathematical Statistics and Probability,, vol. 1, pp. 281-297.

Kagdi et al., "Comparing approaches to mining source code for call-usage patterns," in Proceedings of the Fourth International Workshop on Mining Software Repositories, 2007.

Dong et al., "Efficient mining of emerging patterns: Discovering trends and differnces," in Proceedings of the ACM SIGKDD, 1999.

G. D. Z. W. Li, "CAEP: Classification by Aggregating Emerging Patterns," in International Conference on Discovery Science, 1999.

Betts et al., "Estimating the WCET of GPU-accelerated applications using hybrid analysis," in 25th Euromicro Conference on Real-Time Systems (ECRTS), 2013.

T. Gillis, "Cost Wars: Data Center vs. Public Cloud," Forbes Media LLC, Sep. 2, 2015. [Online]. Available: https://www.forbes.com/sites/tomgillis/2015/09/02/cost-wars-data-center-vs-public-cloud/#492fbe78923f. [Accessed Dec. 18, 2017].

Wilhelm et al., "The worst-case execution-time problem—overview of methods and survey of tools," ACM Transactions on Embedded Computing Systems, vol. 7, No. 3, p. 36, Apr. 1, 2008.

U.S. Appl. No. 15/941,434 entitled, "Allocation of Shared Computing Resources Using Source Code Feature Extraction and Machine Learning," filed Mar. 30, 2018.

Wikipedia contributors, "Newsvendor model," [Online]. Available: https://en.wikipedia.org/wiki/Newsvendor_model. [Accessed Sep. 21, 2017].

* cited by examiner

ALLOCATION OF SHARED COMPUTING RESOURCES USING SOURCE CODE FEATURE EXTRACTION AND CLUSTERING-BASED TRAINING OF MACHINE LEARNING MODELS

FIELD

The field relates generally to resource allocation techniques for a shared computing environment.

BACKGROUND

Recently, shared computing techniques (such as cloud computing techniques) have become a prominent model for business computation. Among other benefits of shared computing, companies, as well as end users, only pay for their usage, without a substantial initial investment, by scaling shared computing resources according to their needs.

Virtualization is an important technology behind cloud computing. Infrastructure providers rely on virtualization to support their business models, as virtualization enables an abstraction of the available resources as virtual components. To efficiently manage these resources, infrastructure providers need efficient scheduling algorithms and good resource allocation policies. Furthermore, infrastructure providers often need to guarantee service level agreements (SLAs) entered with their customers.

Infrastructure providers, however, also need to minimize their management costs as much as possible. Thus, infrastructure providers do not want to be overly conservative in their resource allocation policies to avoid larger costs. Allocating more resources than the needs of a given customer will likely result in increased costs, which might lead to reduced profits or competitiveness. On the other hand, allocating less resources than needed might lead to SLA infringement, which may also lead to penalties and financial loss.

A need therefore exists for improved techniques for allocation of shared computing resources.

SUMMARY

Illustrative embodiments of the present disclosure provide techniques for allocating shared computing resources using source code feature extraction and cluster-based training of machine learning models. In one embodiment, an exemplary method comprises: obtaining a source code corpus with a plurality of source code segments for execution in a shared computing environment; extracting a plurality of discriminative features from the plurality of source code segments in the source code corpus; obtaining at least one trained machine learning model, wherein the at least one trained machine learning model is trained using samples of source code segments from clusters derived from clustering the source code corpus based on (i) a term frequency metric, and/or (ii) observed values of execution metrics; and generating, using the at least one trained model, a prediction of an allocation of one or more resources of the shared computing environment needed to satisfy one or more SLA requirements for one or more source code segments to be executed in the shared computing environment.

In some embodiments, the plurality of discriminative features are extracted from the source code corpus by natural language processing techniques and/or pattern-based techniques. In at least one embodiment, the natural language processing techniques extract one or more of the discriminative features from the source code corpus based on a term frequency metric and wherein the one or more discriminative features from the source code corpus are ranked and selected based on a term frequency inverse document frequency metric.

In one or more embodiments, the pattern-based techniques extract one or more of the discriminative features from the source code corpus by identifying one or more patterns in sequences of function calls of the source code segments in the source code corpus. The one or more patterns are optionally identified, ranked and selected as one or more of the discriminative features from the source code corpus using an emerging patterns technique, and one or more ranges of observed execution metrics are defined to generate each of the one or more clusters.

Other illustrative embodiments include, without limitation, apparatus, systems, methods and computer program products comprising processor-readable storage media.

DETAILED DESCRIPTION

Figure 1:
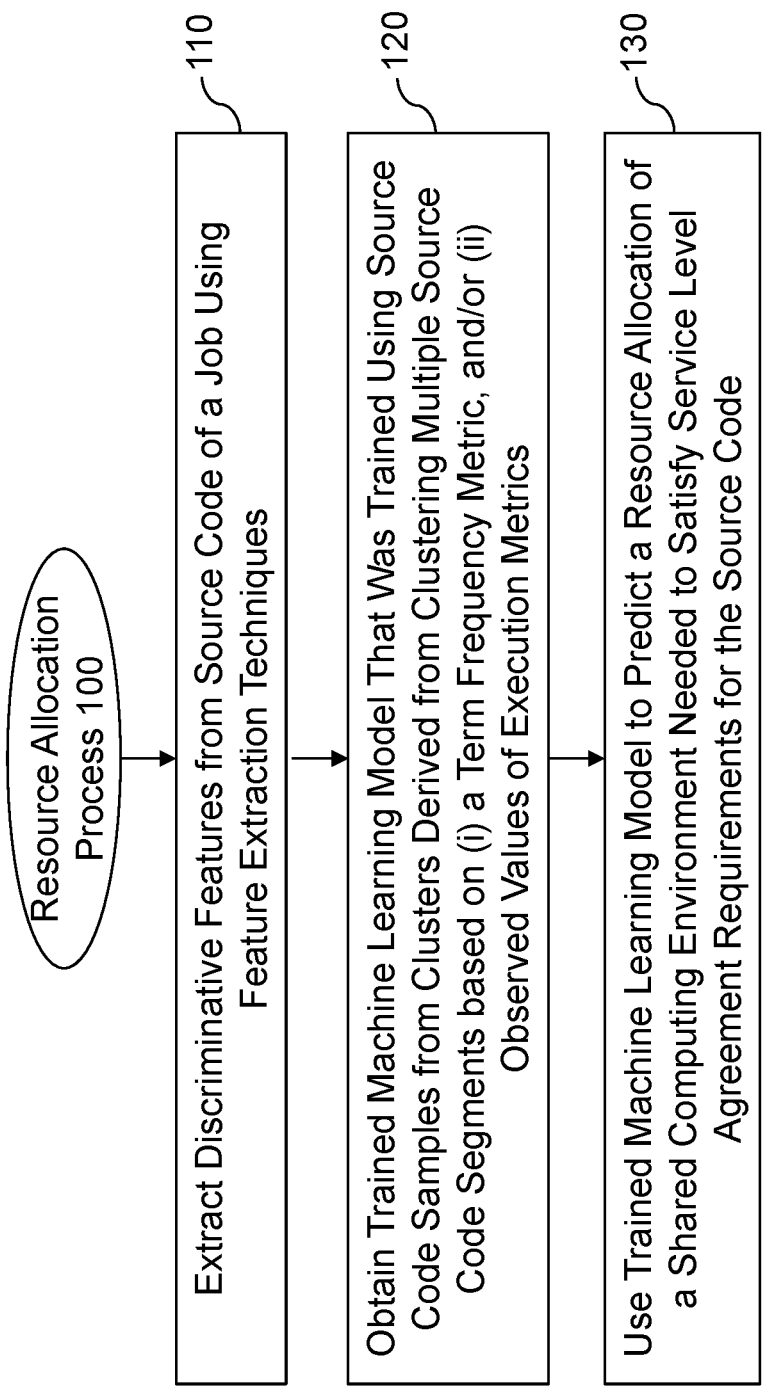
FIG. 1 is a flow chart illustrating an exemplary implementation of a resource allocation process, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for allocation of shared computing resources using source code feature extraction and cluster-based training of machine learning models.

As noted above, infrastructure providers often need to guarantee SLAs (e.g., specified quality metrics) entered with their customers. One commonly used SLA is response time (also referred to as execution time). In serverless computing, for example, the user and the provider agree on a monetary amount to be paid by the user for the execution of a piece of software code by the provider. The software code is executed and the results must be returned before the specified time. The user must then pay for the service. If the execution time violates the SLA, the provider must often pay a penalty.

Optimal resource allocation is an NP-Hard (non-deterministic polynomial-time hard) problem. To properly allocate resources, e.g., using a heuristic, without infringing the agreed upon execution time, providers need a good estimate of how much time it will take to process the given piece of software code and its related input data until completion.

In one or more embodiments, a mechanism is provided for extracting discriminant features directly from source code. These extracted features, coupled with measurements of one or more metrics of SLA requirements (SLA metrics, for short) in sample hardware infrastructures, allow the providers to obtain good estimates when new jobs arrive for execution. Examples of SLA requirements include execution time, accuracy of the results, resource availability, another specified quality metric, or any combination thereof. It is noted that a formal agreement or contract between the user and the service provider regarding the SLA is not required, as would be apparent to a person of ordinary skill in the art. It is assumed in some embodiments that an executable job is associated with: (1) an SLA, and (2) a source code to be executed in the shared infrastructure. The source code of the new executable job may be completely new (e.g., the source code may have never been executed before), and the system will still be able to produce an estimate.

One or more embodiments of the present disclosure provide methods to parse and analyze source code, to extract discriminative features from the source code. Based on these characteristics, it is possible to train machine learning models to have a better understanding of the underlying source code. With the aforementioned models in hand, one can apply them to automatically recognize the profile of the jobs and predict their behavior on particular circumstances.

The disclosed shared computing resource allocation techniques extract features from source code using two exemplary feature extraction techniques: pattern-based techniques (see, e.g., H. Kagdi, M. L. Collard and J. I. Maletic, "Comparing Approaches to Mining Source Code for Call-Usage Patterns," in *Proc. of the Fourth Int'l Workshop on Mining Software Repositories,* 2007); and NLP techniques (see, e.g., M. Allamanis and C. Sutton, "Mining Source Code Repositories at Massive Scale Using Language Modeling," in *Proc. of the 10th Working Conf. on Mining Software Repositories,* 2013). The features are then used as input for training of one or more machine learning models, as discussed further below in conjunction with FIGS. 3 and 5, which are able to predict source code behavior in shared computing infrastructures.

In some embodiments, features extracted from the source code of a job can be considered a fingerprint (e.g., a potentially unique descriptor that identifies an entity). Although a fingerprint may be unique, it probably shares characteristics with other fingerprints. Therefore, one or more embodiments apply clustering techniques to group jobs based on the features of their source code. Each cluster represents a class of jobs that behave similarly. The information about the class is key to resource allocation algorithms.

One or more aspects of the disclosure recognize that using all of the raw features obtained by the disclosed NLP and pattern mining extraction techniques would require a large training dataset in order to build an accurate machine learning model. In the present disclosure, the dimensionality of the feature space is reduced, for example, by ranking terms followed by a selection step or via the extraction of emerging patterns. These two approaches can optionally be combined. In addition, the disclosed NLP and pattern mining extraction strategies have hyper-parameters that are often user-defined, which allows for more flexibility when dealing with different applications. In at least one embodiment, these hyper-parameters might be separately set for each class of jobs.

In at least one embodiment, features extracted from source code, using the disclosed NLP or pattern mining extraction techniques described herein can be regarded as vectors of independent variables. Combined with user restrictions, execution parameters, and the state of the computing resources, for example, these vectors can be used as inputs to train machine learning models. The trained model will be able to predict the behavior (with respect to a SLA metric) of a given job, when running over a set of computing resources. Alternatively, another machine learning model could be trained to learn the required number of resources to execute the job without violating a given SLA metric. In this case, the SLA metric will become part of the feature space, while the number of resources will become the target of the model.

Additional aspects of the disclosure recognize that jobs may have very different profiles. As job dissimilarities can be identified using their corresponding source code features to cluster them into meaningful groups, machine learning models can also be trained to learn the profile of the jobs in each group. By creating a model for each group, there is a higher chance to obtain more accurate predictions.

In some embodiments, in order to obtain the prediction models, techniques are provided to separate source code of executable jobs, which have already been executed before, into classes using clustering techniques. In addition, one or more machine learning models are trained to predict a required number of resources to finish the execution of a source code of an executable job which has never been executed before, on a given time frame, avoiding SLA violation. Based on such models, it is possible to adjust the resource allocation estimate, maximizing the expected profit of the service provider.

As noted above, optimal resource allocation is an NP-hard problem. Resource allocation becomes even more complicated on distributed and shared resources where a large number of variables influence the performance of the underlying infrastructure. When a new executable job arrives and the source code of the new executable job has never been executed before, the provisioning system must decide a proper resource allocation based on the source code of the executable job, the corresponding input data and the infrastructure current state. This situation poses a set of challenges, introduced hereinafter.

If the source code of the executable job has never been executed, it is hard to know how the source code of the executable job impacts the system load. The execution of the source code of the job may be CPU (central processing unit) bound or I/O (input/output) bound, for example. The execution of the source code of the job may also load a lot of data in memory. It is complicated to parse the source code of the job and to decide which class the source code of that given job belongs. Thus, there is a need for a set of tools and heuristics to extract relevant information from source code and use learn-by-example strategies to discover how to classify a given source code of a given job.

In addition, in some embodiments, the source code associated with a given job may have no restriction in terms of number of lines, and some source code might have tens of thousands or even hundreds of thousands of lines. To properly train machine learning models, the number of observations (e.g., data points in the training dataset) should be at least ten times larger than the number of features. Given this, using every term in the source code as features is impractical, as it would require millions of different pieces of source code. It is then necessary to appropriately select the features to be used as input to the machine learning models so as to achieve good generalization capacity, using a realistic number of observations.

It is also a problem to define how many resources are required to complete the execution of an arbitrary source code of a job in a specified time, such as a set of hours. This is a consequence of the level of entropy of a distributed computer system. There are typically too many hardware particularities, compiler optimizations and operating system policies, for example, that affect the performance. Thus, it is often necessary to understand how particular patterns and other features of the source code are associated with their performance on the available hardware.

Resource Allocation Using Feature Extraction and Clustering-Based Training

U.S. patent application Ser. No. 15/941,434, filed Mar. 30, 2018, entitled "Allocation of Shared Computing Resources Using Source Code Feature Extraction and Machine Learning," incorporated by reference herein in its entirety, describes a number of methods to extract discriminative features from source code, as a means to better allocate resources. For example, the features can be selected based on a pre-defined vocabulary of terms or based on a pre-defined pattern set of interest.

In one or more embodiments of the present disclosure, techniques are provided for building the aforementioned vocabulary, using NLP, and for building the pattern set of interest, using a pattern mining technique. In addition, we detail the creation of two different machine learning models: (1) a model to predict the value of a given SLA metric, using the vocabulary set as input features, and (2) a model to predict a range of values of a given SLA metric, using the pattern set as input features.

FIG. 1 is a flow chart illustrating an exemplary implementation of a resource allocation process 100, according to one embodiment of the disclosure. As shown in FIG. 1, the exemplary resource allocation process 100 initially extracts discriminative features from the source code of an executable job during step 110, for example, using one or more feature extraction techniques. Thus, step 110 obtains discriminative features from the source code to be used as input to the machine learning models.

In one or more embodiments, the exemplary feature extraction techniques comprise NLP techniques, as discussed further below in conjunction with FIG. 2, and/or pattern-based techniques, as discussed further below in conjunction with FIG. 4.

Thereafter, the exemplary resource allocation process 100 obtains a trained machine learning model during step 120 that was trained using source code samples from clusters derived from clustering multiple source code segments based on (i) a term frequency metric, as discussed further below in conjunction with FIG. 3; and/or (ii) observed values of execution metrics, as discussed further below in conjunction with FIG. 5. It is noted that the term "source code segments" is used herein to convey a plural form of "source code."

Finally, the exemplary resource allocation process 100 uses the trained machine learning model during step 130 to predict a resource allocation of a shared computing environment, for example, needed to satisfy SLA requirement(s) for the source code.

In one or more embodiments, a set of past executions of the source code from which the features were extracted are used to train a machine learning model. A record of a past execution comprises a reference for the corresponding source code, a list of input configuration parameters, and input datasets (the last two referred to herein as execution parameters, for ease of illustration).

Machine Learning Model Based on Vocabulary Set

Extracting Discriminative Features as Vocabulary Set

The field of NLP was originally meant to analyze a corpus of text documents. Generally, it uses the frequency of terms in the document as a way to describe the document. U.S. patent application Ser. No. 15/941,434 applies NLP techniques to source code. The textual features extracted from source code, being in a parsed format or a raw string format, are related to a number of SLA metrics and particularly with respect to execution time and memory sizing.

Among the NLP techniques, Term Frequency-Inverse Document Frequency (TF-IDF) is particularly interesting for extracting discriminative features from source code. Generally speaking, given a corpus of documents, this measure is high when a term (word) occurs many times within a small number of such documents (thus better discriminating them). At least one embodiment of this disclosure provides a strategy that uses a TF-IDF measure to extract discriminative features from a collection of source code, as follows.

Figure 2:
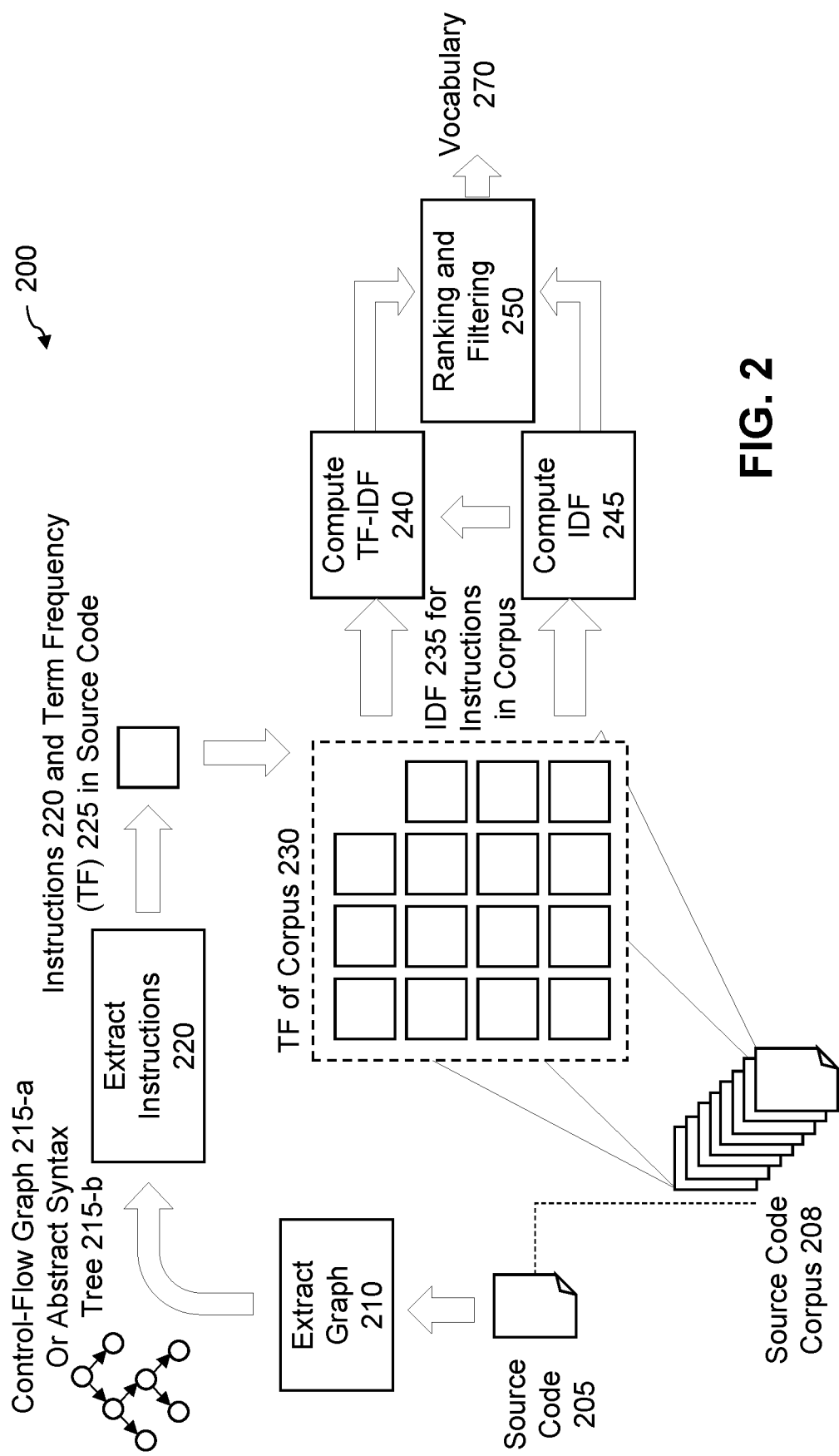
FIG. 2 is a flow chart illustrating an exemplary implementation of a natural language processing (NLP)-based process for extracting discriminative features from a source code, according to at least one embodiment.

FIG. 2 is a flow chart illustrating an exemplary implementation of an NLP-based process 200 for extracting discriminative features from a source code, according to at least one embodiment of the disclosure.

As shown in FIG. 2, for the source code 205, the exemplary NLP-based process 200 initially automatically extracts the corresponding control flow graph (CFG) 215-a during step 210. Depending on the program language of the source code 205, a corresponding abstract syntax tree 215-b could be extracted alternatively, or as well.

Each of the extracted CFGs 215 (one for each source code) is then transformed to extract a bag of computer instructions, which may contain instructions 220 from internal libraries that are invoked by the original source code. In one exemplary implementation, each computer instruction 220 is equivalent to a term in a text document. The term frequency (TF) 225 of each instruction 220 in the source code is computed. In addition, the inverse document frequency (IDF) 235 of each instruction 220 in the corpus 208 of source code 205 is computed at step 230.

For each source code 205, the TF-IDF of each instruction is calculated at step 240 and the IDF of each instruction is calculated at step 245. Finally, in the embodiment of FIG. 2, a subset of instructions, referred to herein as terms, is then selected as the final vocabulary set 270, based on, e.g., a ranking and filtering strategy performed at step 250.

Training Machine Learning Model(s) Based on Vocabulary Set

Figure 3:
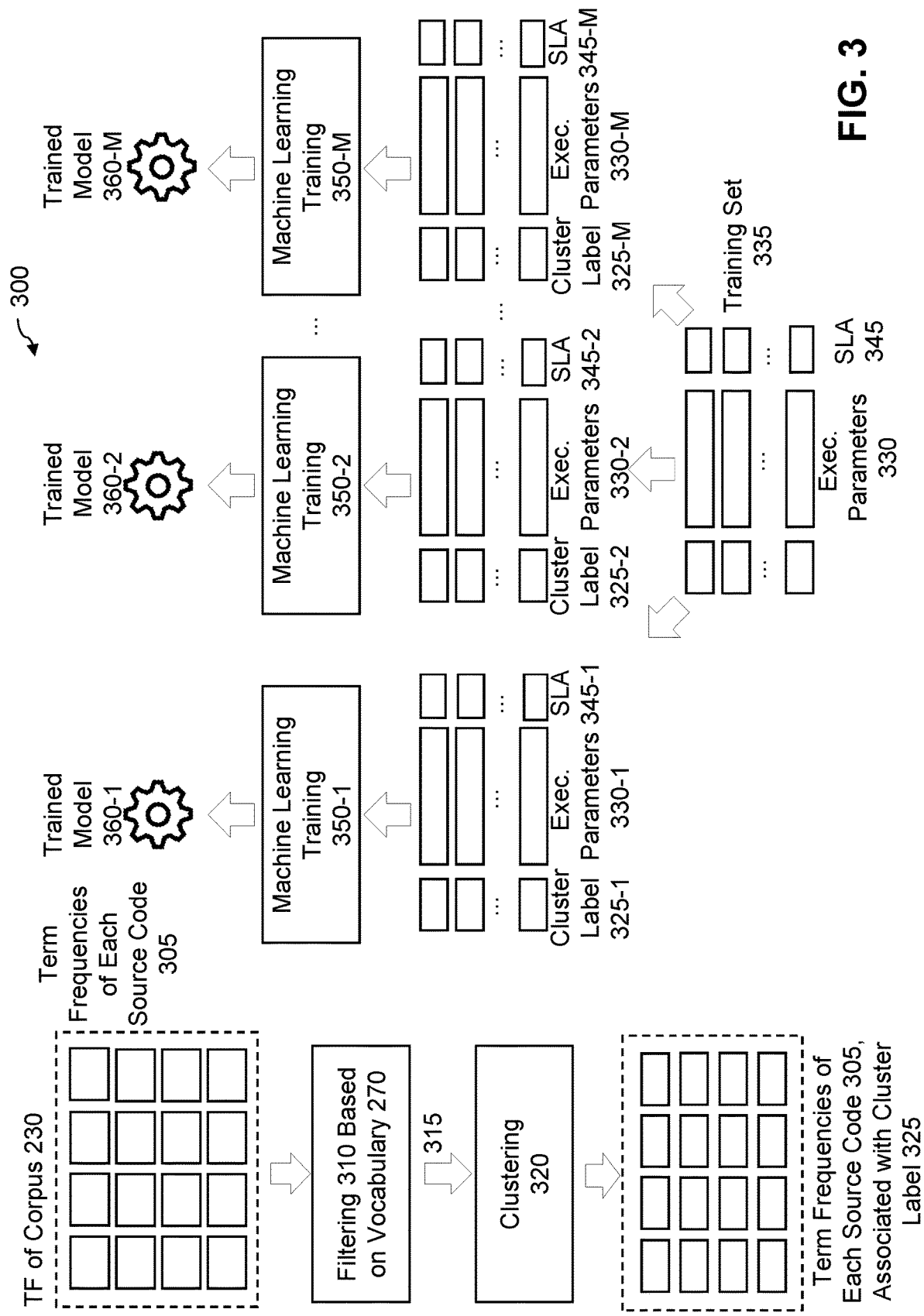
FIG. 3 is a flow chart illustrating an exemplary implementation of an NLP-based training process for training machine learning models using samples of source code from clusters derived from clustering a plurality of source code based on a term frequency metric, according to an embodiment.

FIG. 3 is a flow chart illustrating an exemplary implementation of an NLP-based training process 300 for training one or more machine learning models 360-1 through 360-M using samples of source code from clusters derived from clustering a plurality of source code based on a term frequency metric, according to an embodiment.

As shown in FIG. 3, the exemplary NLP-based training process 300 trains the machine learning model(s) 360 based on execution parameters 330 of past executions from a training set 335 and the vocabulary 270 of interest, as follows.

First, for each source code in the source code corpus 208, the term frequencies of each source code 305 are computed. Then, for each source code, a vector 315 of term frequencies is optionally created, considering only the terms in the vocabulary 270, following a filtering step 310. Each position of the term frequency vector 315 represents a term and indicates its corresponding frequency. Alternatively, an array of Boolean values can be created, in which each position will indicate the presence or absence of a given term of interest in the corresponding source code. This filtering step 310 substantially guarantees that all the source code are described based on the same set of terms.

The source code are grouped by their term frequency vector 315, using a clustering technique 320, such as a K-Means technique (see, e.g., J. MacQueen, "Some Methods for Classification and Analysis of Multivariate Observations," *Proc. of Fifth Berkeley Symposium on Mathematical Statistics and Probability*, Vol. 1, 281-297). The clustering technique 320 produces term frequencies of each source code 305, associated with a cluster label 325. Thus, source code with similar term frequencies will belong to the same cluster having the same associated cluster label 325.

As the execution parameters 330 of each past execution in the training set 335 is associated with a source code and each source code is now associated with a cluster label 325, the execution parameters 330-1 through 330-M of each past execution in the training set 335 is then segmented by cluster label 325-1 through 325-M, as shown in FIG. 3. The corresponding SLA 345-1 through 345-M is also associated with each past execution.

As shown in FIG. 3, a machine learning model 360-1 through 360-M is trained using a corresponding machine learning training process 350-1 through 350-M for each cluster c, having a corresponding cluster label 325-1 through 325-M. Each machine learning model 360 has, as training data, the union of the term frequencies of each source code 305 associated with the source code of the past executions in the corresponding cluster c as well as their execution parameters 330. In addition, each machine learning model 360 also has, as a target (e.g., the value to be predicted), the SLA metric 345 in question.

To predict the SLA metric of a new job j, that is, a job that has never been run before, one has to (1) construct the vector of term frequencies 315 of new job j based on its source code (considering only the terms in the vocabulary 270), (2) determine the cluster c to which new job j belongs, based on its vector of term frequencies 315, and (3) apply to new job j the machine learning model 360 trained for cluster c, having, as input, its vector of term frequencies 315 together with its execution parameters 330.

Machine Learning Model Based on Pattern Set of Interest Mining Patterns as Discriminative Features As noted above, features can also be extracted via a pattern mining related method (see, e.g., H. Kagdi, M. L. Collard and J. I. Maletic, "Comparing Approaches to Mining Source Code for Call-Usage Patterns," in *Proc. of the Fourth Int'l Workshop on Mining Software Repositories*, 2007). Algorithms such as itemset mining and sequence mining can effectively be used to identify patterns in sequential function calls. These patterns, coupled with additional features, e.g., the corresponding execution parameters 330, directly relate to various SLA metrics 345. In at least one embodiment of this disclosure, a pattern mining approach is employed to mine for discriminative features from a corpus of source code.

Figure 4:
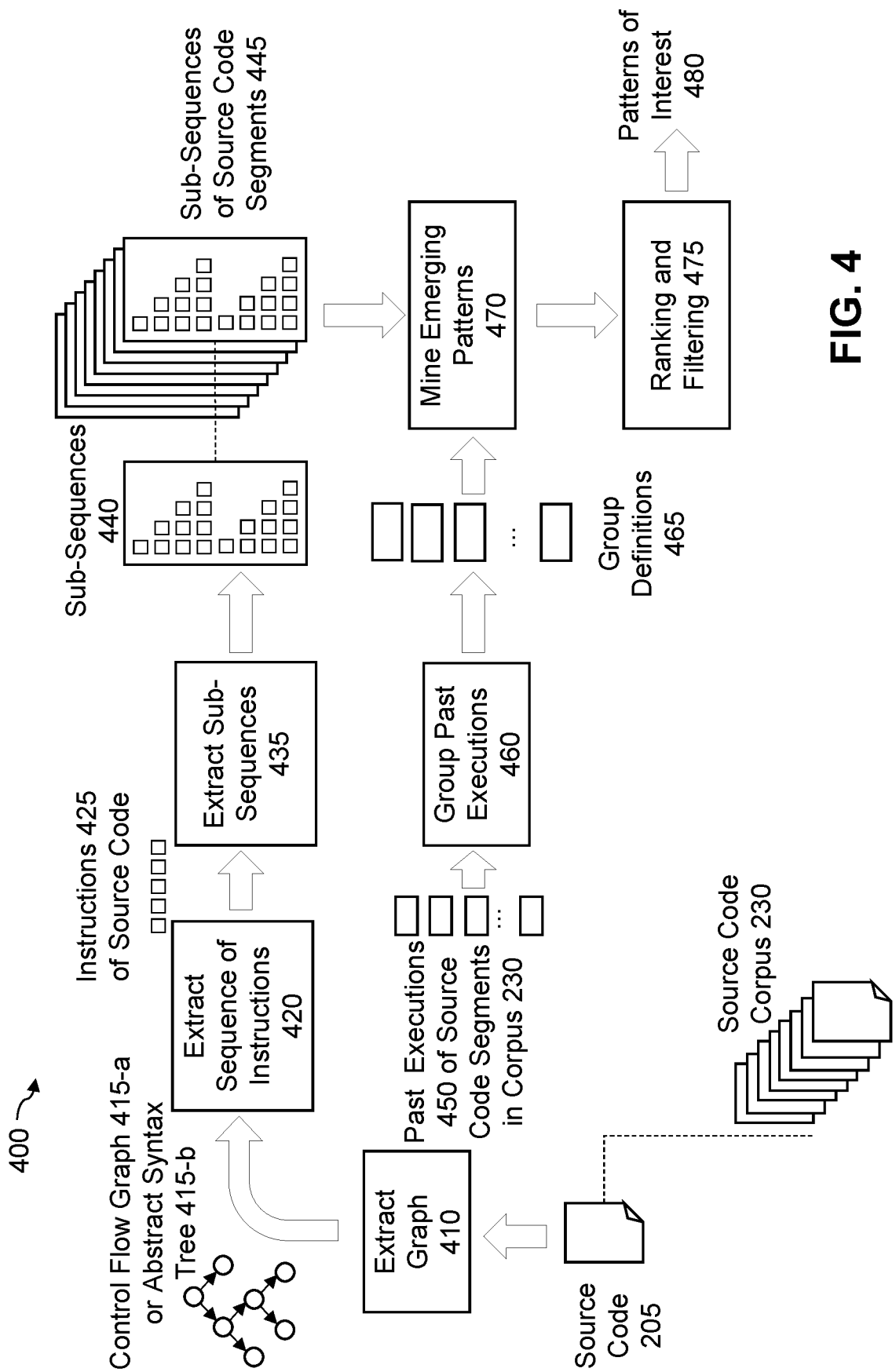
FIG. 4 is a flow chart illustrating an exemplary implementation of a pattern-based process for extracting discriminative features from a source code, according to at least one embodiment of the disclosure.

FIG. 4 is a flow chart illustrating an exemplary implementation of a pattern-based process 400 for extracting discriminative features from a source code, according to at least one embodiment. As shown in FIG. 4, for the source code 205, the exemplary pattern-based process 400 initially automatically extracts the corresponding control flow graph (CFG) 415-a during step 410. Depending on the program language of the source code 205, a corresponding abstract syntax tree 415-b could be extracted alternatively, or as well.

Each of the extracted CFGs 415 (one for each source code 205) is then transformed to extract a long sequence of computer instructions 425 during step 420, which may contain instructions 425 from internal libraries that are invoked by the original source code.

Thereafter, the exemplary pattern-based process 400 extracts sub-sequences of computer instructions during step 435 of size of at least n and at most m (where n and m are user-defined) from each of the long sequences of computer instructions 425.

The training set, composed with past executions 450 of the source code 205 in the corpus 230, are grouped during step 460 based on a similarity of their measured SLA metrics, to generate a plurality of corresponding group definitions 465 (for example, by applying a clustering algorithm, such as a K-means technique, as described above). In the case when the SLA metric is the execution time, for example, each cluster will then represent a [min, max] execution time range.

During step 470, the exemplary pattern-based process 400 mines for emerging patterns, as described in, for example, G. Dong and J. Li, "Efficient Mining of Emerging Patterns: Discovering Trends and Differences," in *Proc. of ACM SIGKDD* (1999). In other words, step 470 mines for sub-sequences of source code 445 whose frequencies within a cluster are significantly higher than in other clusters.

Finally, a subset of emerging patterns (sub-sequences 440) are then selected during step 475 as the patterns of interest 480, based on, e.g., a ranking and filtering strategy. It is noted that the ranking and filtering criteria during step 475 can take advantage of the metric "score" described in, for example, G. Li, "CAEP: Classification by Aggregating Emerging Patterns," in *Int'l Conf. on Discovery Science* (1999). In further variations, other metrics can be applied, such as the growth-rate of the pattern.

Training Machine Learning Model Based on Patterns of Interest

Figure 5:
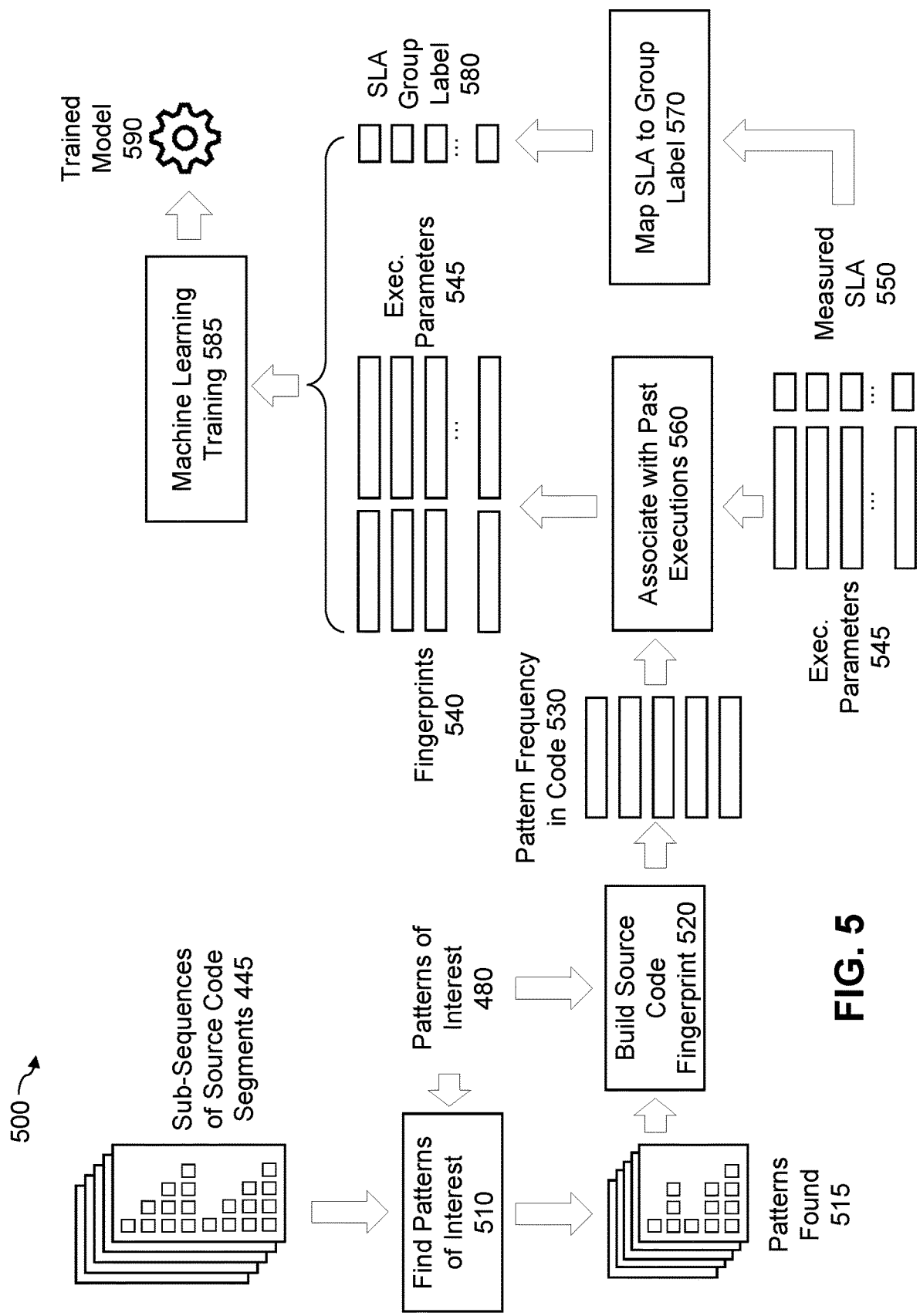
FIG. 5 is a flow chart illustrating an exemplary implementation of a pattern-based training process for training one or more machine learning models using samples of source code from clusters derived from clustering a plurality of source code based on observed values of execution metrics, according to an embodiment.

FIG. 5 is a flow chart illustrating an exemplary implementation of a pattern-based training process 500 for training one or more machine learning models 590 using samples of source code from clusters derived from clustering a plurality of source code based on observed values of execution metrics, according to an embodiment.

The exemplary pattern-based training process 500 trains a machine learning model 590 based on execution parameters 545 of past executions and the pattern set of interest 480, as follows. As shown in FIG. 5, the exemplary pattern-based training process 500 initially, for each source code 205 in the corpus 230, finds the patterns of interest 515 during step 510 (extracted, for example, via the exemplary pattern-based process 400 of FIG. 4) in its corresponding sub-sequences of source code 445.

Then, for each source code, a fingerprint is created during step 520 and pattern frequencies in the source code 530 are identified. In one or more embodiments, a fingerprint is a vector of size equal to the number of patterns of interest 515, in which each position represents a pattern and indicates its corresponding frequency. Alternatively, an array of Boolean values can be created, in which each position will indicate the presence or absence of a pattern of interest in the corresponding source code;

Next, for the execution parameters 545 for each available past execution, the fingerprint 540 of its corresponding source code are coupled with its execution parameters 545 during step 560. A feature vector as a training example for the machine learning training process 585 thus comprises the corresponding fingerprint 540 together with the execution parameters 545.

The SLA metric value 550 of each past execution is mapped during step 570 to the corresponding SLA group label 580 (which is defined when the patterns of interest 515 are extracted, as described above).

As shown in FIG. 5, a machine learning model 590 is trained by the machine learning training process 585, having (1) as input data: the union of the feature vectors of the past executions; and (2) as target (the value to be predicted): the cluster label. In other words, the model will predict a [min, max] SLA metric value range.

To predict the [min, max] SLA metric value range of a new job j, that is, a job that has never been run before, one has to (1) construct the feature vector for new job j, and (2) apply to new job j the trained machine learning model 590, having, as input, its feature vector.

Resource Allocation Recommendations

Figure 6:
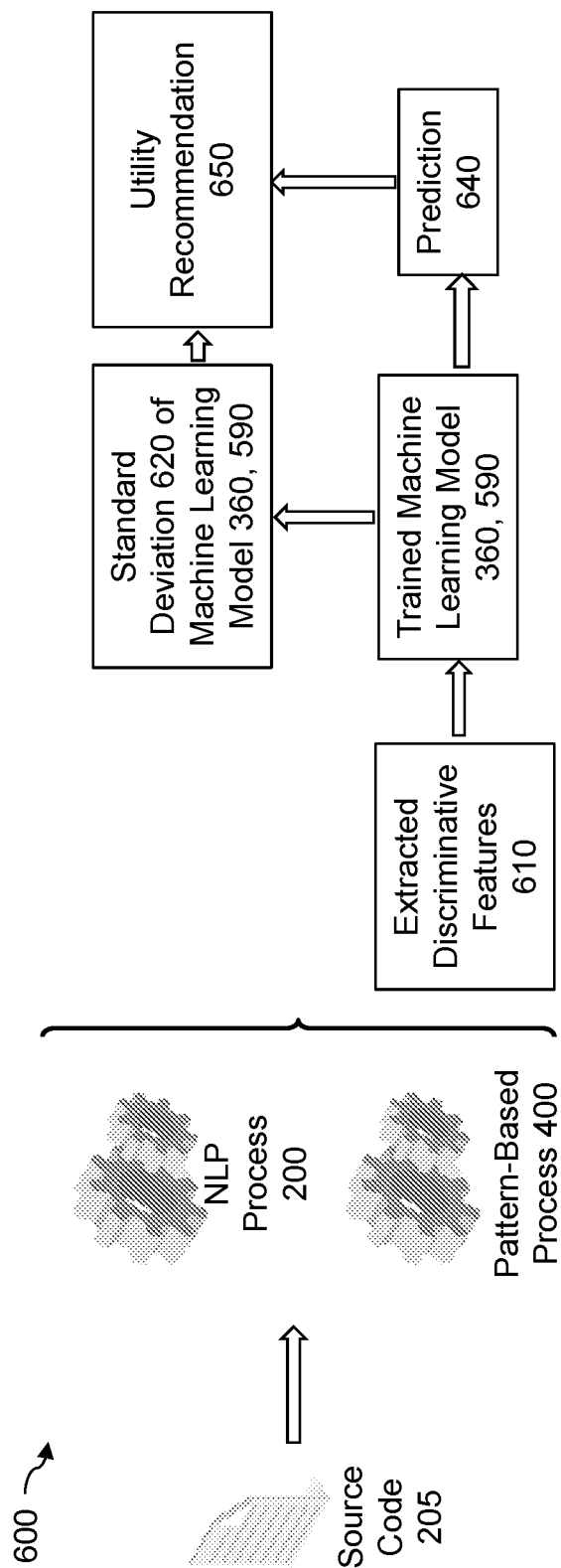
FIG. 6 is a flow chart illustrating an exemplary implementation of a resource allocation recommendation process, according to one embodiment.

FIG. 6 is a flow chart illustrating an exemplary implementation of a resource allocation recommendation process 600, according to one embodiment. As shown in FIG. 6, the exemplary sources of discriminative features for the resource allocation recommendation process 600 of FIG. 6 comprise a set of discriminative features 610 extracted from the source code 205 to be executed in the shared computing environment, for example, using one or more of the NLP-based process 200 of FIG. 2, and/or the pattern-based process 400 of FIG. 4. The extracted discriminative features 610 serve as input to the trained machine learning model(s) 360, 590 of FIGS. 3 and 5.

The exemplary trained machine learning model(s) 360, 590 generates one or more current predictions 640 of an allocation of resources of the shared computing environment that are needed to satisfy one or more specified SLA requirements between the user and the service provider of the shared computing environment, as described above. The exemplary resource allocation recommendation process 600 optionally augments the current predictions 640 with one or more error boundaries (e.g., a "slack"), based on a standard deviation 620 of the machine learning model(s) 360, 590, to produce an augmented prediction comprising a substantially optimal utility recommendation 650.

With this new augmented prediction and a given utility function, it is possible to calculate the resource allocation that substantially maximizes an expected utility. One of the most used utility functions in Cloud Services business models is a hard SLA metric constraint. In at least one embodiment, the utility function is the hard threshold and the error can be modeled as a Gaussian curve. If that is the case, an analytical optimal can be found, derived directly from marginal analysis as detailed in the newsvendor model (see, e.g., Wikipedia contributors, "Newsvendor Model," available online from wikipedia.org), as shown by the following equations:

$$c_e P[x \leq R] = c_s(1 - P[x \leq R])$$
$$P[x \leq R] = \frac{c_s}{c_e + c_s},$$

where $c_e$ is the cost of using excess of resources, $c_s$ is the cost of using too little resources, and $P[x \geq R]$ is the probability of needing fewer than R amount of resources. If X is defined by an invertible probability density function, such as a Gaussian distribution, the critical k can be found using normal tables. Afterwards, the predictions 640 can be adjusted to match the inherent error distribution:

$$nP = P + k \cdot \sigma,$$

where nP is the new optimal prediction, P is the prediction made by the machine learning model and $\sigma$ is the standard deviation of the machine learning model error.

In one suitable exemplary implementation, a serverless computing service provider offers the execution of programs on specialized hardware. For example, HPC (high performance computing) execution on computer clusters with high quality graphics processing unit (GPU) boards. The provider manages the allocation of such resources, while pricing is based on the actual amount of resource consumed by the submitted jobs. Additionally, a hypothetical customer enters an SLA with the exemplary service provider specifying that the submitted executable jobs need to be completed within 24 hours. When the customer submits a new executable job, the service provider needs to decide how much of the infrastructure should be reserved for that job in order to satisfy the SLA. This is a hard problem, especially if that type of source code of the job has never been executed before.

The sole information the service provider has about the new job is the source code and corresponding input data. Thus, the service provider needs to extract relevant characteristics from them and find similarities from past experiences in order to make a performance approximation. This process is enabled by one or more trained machine learning model(s) 360, 590 of FIGS. 3 and 5, trained with past executions of source code 205. The service provider can use the trained machine learning model(s) 360, 590 to predict the required number of resources to execute the new job based on features from its source code and input data. Furthermore, the error margin of the model can be used to find resource allocation policies that could substantially maximize the profit of the service provider, while also satisfying the SLA metrics.

Pay-per-use models in computing environments allow for better resource usage and fairer pricing. However, from the service provider perspective, efficient resource allocation might be challenging. This is especially true for serverless computing environments, where the service provider needs to allocate the appropriate resources to run a job, before running the job itself. Sometimes, the service provider can only access the source code of the job to make a performance approximation. On the occasion that there is an SLA between the customer and the service provider, several other requirements should also be taken into consideration.

In addition, when there is an SLA between the customer and the service provider, several other requirements should also be taken into consideration to avoid fines, contract breaches or even legal liabilities. A possible reference about how a given job might perform is its associated source code. When the source code is available, it is possible to analyze the source code to estimate how that particular job is going to behave on a certain infrastructure, with respect to SLA metrics (e.g., execution time and quality of the results).

Among other benefits, the disclosed resource allocation techniques that employ cluster-based training of machine learning models allocate computing resources supported by source code feature extraction and machine learning. In one or more embodiments, the disclosed resource allocation techniques leverage well-known feature extraction techniques, such as NLP, pattern-based extraction and control-flow graph analysis.

One or more embodiments of the disclosure provide improved methods, apparatus and computer program products for allocation of shared computing resources using source code feature extraction and cluster-based training of machine learning models. The foregoing applications and associated embodiments should be considered as illustrative only, and numerous other embodiments can be configured using the techniques disclosed herein, in a wide variety of different applications.

It should also be understood that the disclosed resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for allocating shared computing resources using source code feature extraction and cluster-based training of machine learning models may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource allocation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
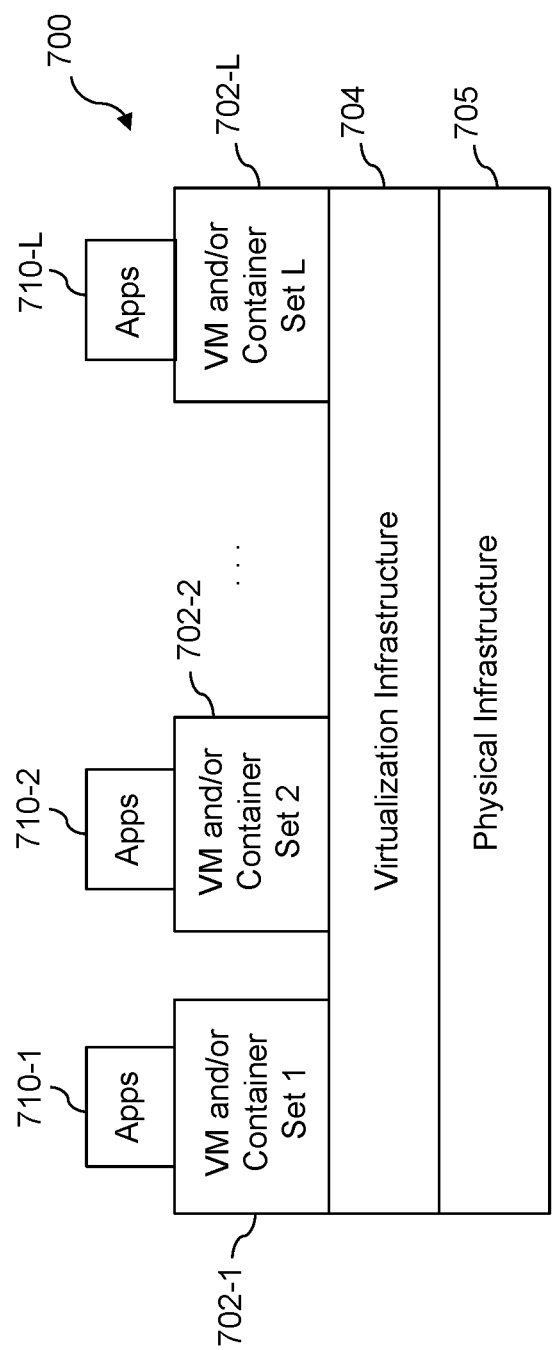
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the resource allocation and model training system. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide resource allocation functionality of the type described above for one or more processes running on a given one of the VMs. For example, each of the VMs can implement resource allocation control logic and associated resource allocation functions for providing an allocation of resources for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide resource allocation functionality of the type described above for one or more processes running on different ones of the containers. For example, a container host device supporting multiple containers of one or more container sets can implement one or more instances of resource allocation control logic and associated resource allocation functions for generating a resource allocation.

As is apparent from the above, one or more of the processing modules or other components of a resource allocation system may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, ... 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
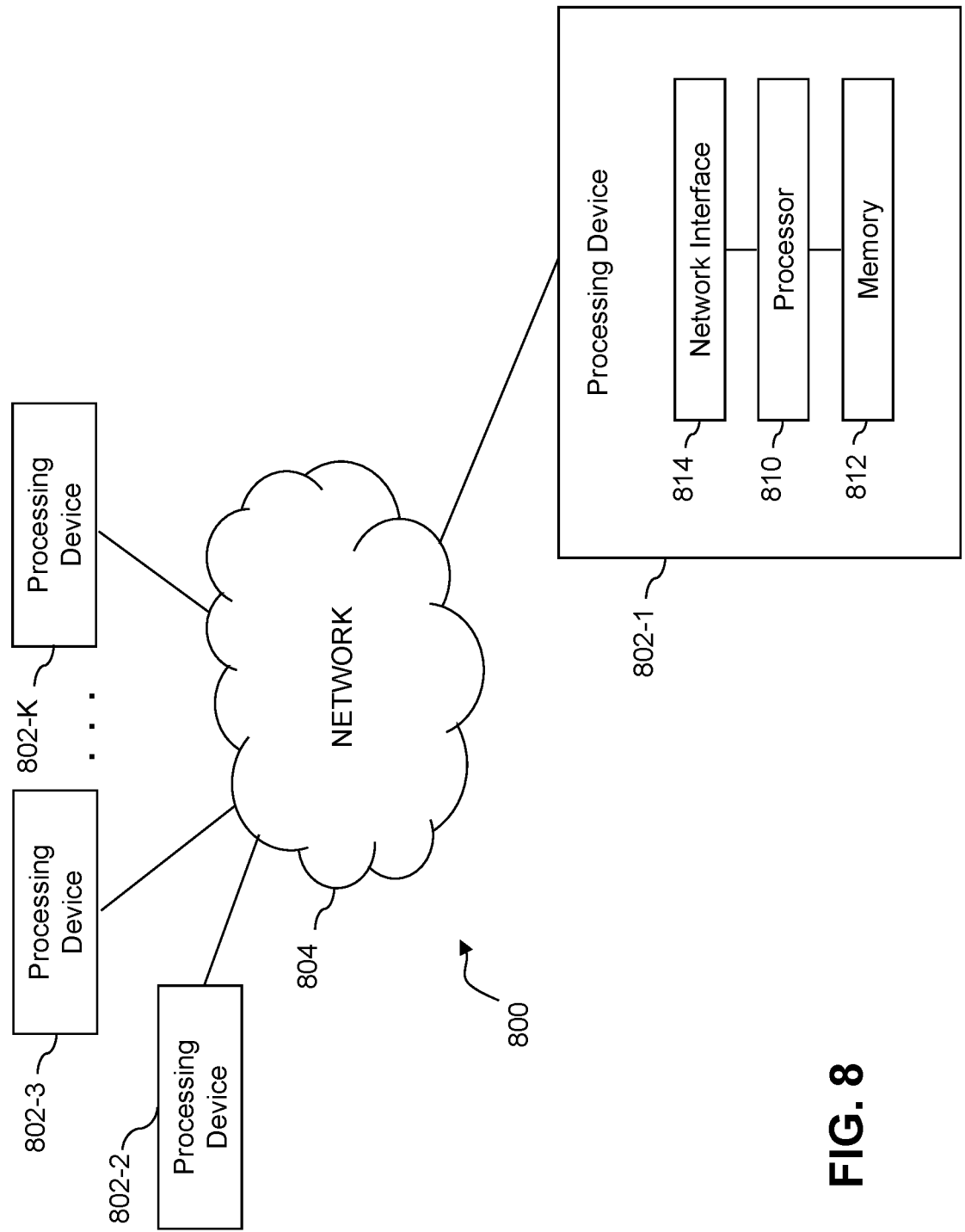
FIG. 8 illustrates another exemplary processing platform that may be used to implement at least a portion of one or more embodiments of the disclosure.

Multiple elements of the disclosed resource allocation computer system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a source code corpus with a plurality of source code segments for execution in a shared computing environment;

extracting, using at least one processing device, a plurality of discriminative features from the plurality of source code segments in the source code corpus;

obtaining, using the at least one processing device, at least one trained machine learning model, wherein the at least one trained machine learning model is trained using samples of source code segments from one or more clusters derived from clustering the source code corpus based on one or more of (i) a term frequency metric, and (ii) observed values of execution metrics, and wherein the at least one trained machine learning model is trained using a set of discriminative features extracted from the source code corpus and corresponding measurements of metrics of one or more service level agreement requirements obtained by executing the source code corpus on one or more resources of the shared computing environment; and generating, using the at least one processing device and the at least one trained machine learning model, a prediction of an allocation of the one or more resources of the shared computing environment needed to satisfy the one or more service level agreement requirements for the plurality of source code segments in the source code corpus to be executed in the shared computing environment.

2. The method of claim 1, wherein the extracting of the plurality of discriminative features from the plurality of source code segments in the source code corpus employs one or more of natural language processing techniques and pattern-based techniques.

3. The method of claim 2, wherein the natural language processing techniques extract one or more of the plurality of discriminative features from the source code corpus based on a term frequency metric.

4. The method of claim 3, wherein the one or more of the plurality of discriminative features from the source code corpus are ranked and selected based on a term frequency inverse document frequency metric.

5. The method of claim 2, wherein the pattern-based techniques extract one or more of the plurality of discriminative features from the source code corpus by identifying one or more patterns in sequences of function calls of the plurality of source code segments in the source code corpus.

6. The method of claim 5, wherein the one or more patterns in the sequences of function calls of the plurality of source code segments in the source code corpus are identified, ranked, and selected as the one or more of the plurality of discriminative features from the source code corpus using an emerging patterns technique.

7. The method of claim 5, further comprising defining one or more ranges of observed execution metrics to generate each cluster of the one or more clusters derived from the clustering of the source code corpus.

8. A computer program product, comprising a non-transitory processor-readable storage medium having encoded therein executable code of one or more software programs, wherein the one or more software programs when executed by at least one processing device perform the following steps:

obtaining a source code corpus with a plurality of source code segments for execution in a shared computing environment;

extracting a plurality of discriminative features from the plurality of source code segments in the source code corpus;

obtaining at least one trained machine learning model, wherein the at least one trained machine learning model is trained using samples of source code segments from one or more clusters derived from clustering the source code corpus based on one or more of (i) a term frequency metric, and (ii) observed values of execution metrics, and wherein the at least one trained machine learning model is trained using a set of discriminative features extracted from the source code corpus and corresponding measurements of metrics of one or more service level agreement requirements obtained by executing the source code corpus on one or more resources of the shared computing environment; and generating, using the at least one trained machine learning model, a prediction of an allocation of the one or more resources of the shared computing environment needed to satisfy the one or more service level agreement requirements for the plurality of source code segments in the source code corpus to be executed in the shared computing environment.

9. The computer program product of claim 8, wherein the step of extracting the plurality of discriminative features from the plurality of source code segments in the source code corpus employs one or more of natural language processing techniques and pattern-based techniques.

10. The computer program product of claim 9, wherein the natural language processing techniques extract one or more of the plurality of discriminative features from the source code corpus based on a term frequency metric.

11. The computer program product of claim 10, wherein the one or more of the plurality of discriminative features from the source code corpus are ranked and selected based on a term frequency inverse document frequency metric.

12. The computer program product of claim 9, wherein the pattern-based techniques extract one or more of the plurality of discriminative features from the source code corpus by identifying one or more patterns in sequences of function calls of the plurality of source code segments in the source code corpus.

13. The computer program product of claim 12, wherein the one or more patterns in the sequences of function calls of the plurality of source code segments in the source code corpus are identified, ranked, and selected as the one or more of the plurality of discriminative features from the source code corpus using an emerging patterns technique.

14. The computer program product of claim 13, further comprising the step of defining one or more ranges of observed execution metrics to generate each cluster of the one or more clusters derived from the clustering of the source code corpus.

15. An apparatus, comprising:

a memory; and at least one processing device, coupled to the memory, operative to implement the following steps:

obtaining a source code corpus with a plurality of source code segments for execution in a shared computing environment;

extracting a plurality of discriminative features from the plurality of source code segments in the source code corpus;

obtaining at least one trained machine learning model, wherein the at least one trained machine learning model is trained using samples of source code segments from one or more clusters derived from clustering the source code corpus based on one or more of (i) a term frequency metric, and (ii) observed values of execution metrics, and wherein the at least one trained machine learning model is trained using a set of discriminative features extracted from the source code corpus and corresponding measurements of metrics of one or more service level agreement requirements obtained by executing the source code corpus on one or more resources of the shared computing environment; and generating, using the at least one trained machine learning model, a prediction of an allocation of the one or more resources of the shared computing environment needed to satisfy the one or more service level agreement requirements for the plurality of source code segments in the source code corpus to be executed in the shared computing environment.

16. The apparatus of claim 15, wherein the step of extracting the plurality of discriminative features from the plurality of source code segments in the source code corpus employs one or more of natural language processing techniques and pattern-based techniques.

17. The apparatus of claim 16, wherein the natural language processing techniques extract one or more of the plurality of discriminative features from the source code corpus based on a term frequency metric.

18. The apparatus of claim 17, wherein the one or more of the plurality of discriminative features from the source code corpus are ranked and selected based on a term frequency inverse document frequency metric.

19. The apparatus of claim 16, wherein the pattern-based techniques extract one or more of the plurality of discriminative features from the source code corpus by identifying one or more patterns in sequences of function calls of the plurality of source code segments in the source code corpus.

20. The apparatus of claim 19, wherein the one or more patterns in the sequences of function calls of the plurality of source code segments in the source code corpus are identified, ranked, and selected as the one or more of the plurality of discriminative features from the source code corpus using an emerging patterns technique, and further comprising the step of defining one or more ranges of observed execution metrics to generate each cluster of the one or more clusters derived from the clustering of the source code corpus.

* * * * *